United States Patent Office 3,794,624
Patented Feb. 26, 1974

3,794,624
HIGHLY TRANSPARENT LINEAR POLYAMIDES FROM CAPROLACTAM AND A MIXTURE OF DIAMINO BICYCLOHEXYLS AND A DIBASIC ORGANIC ACID
Raymond Paul Anderson, Overland Park, Kans., assignor to Custom Resins, Inc., Henderson, Ky.
No Drawing. Filed Oct. 12, 1971, Ser. No. 188,526
Int. Cl. C08g 20/12
U.S. Cl. 260—78 L                        11 Claims

ABSTRACT OF THE DISCLOSURE

High molecular weight linear polyamides having the property of being transparent in compression molded specimens at least 1" thick are prepared by polymerization of a monomer mixture consisting of 60 to 80 weight percent of caprolactam and, correspondingly, 40 to 20 weight percent of an equimolar mixture of a diamine and a dibasic organic acid in which the diamine consists of two or more of the isomers of diaminobicyclohexyl and the dibasic organic acid consists of one or more aromatic dicarboxylic acid or an alpha, omega-aliphatic dicarboxylic acid. Typically, the transparent linear polyamides are prepared from a monomer mixture consisting of 67 weight percent of caprolactam and 33 weight percent of an equimolar mixture of azelaic acid and a mixture of 2,4'-diaminobicyclohexyls and 4,4'-diaminobicyclohexyls.

BACKGROUND OF THE INVENTION

Multitudes of high molecular weight linear polyamides are known in the art. Typical of such high molecular weight linear polyamides are nylon-6, prepared by the polymerization of caprolactam, and nylon-6, prepared by the polymerization of an equimolar mixture of adipic acid and hexamethylenediamine. One limitation on the utility of such linear polyamides is that they are opaque when molded in thick sections of the order of $\frac{1}{16}$" thick and such opaqueness limits their use for certain industrial purposes such as the manufacture of glazing, lighting fixtures, and the like.

SUMMARY OF THE INVENTION

A new class of high molecular weight linear polyamides has been discovered, which has substantially all of the desirable physical characteristics of nylon-6, and which has the additional characteristic of being transparent in thick molded sections such as compression molded sections 1" thick. Such polyamides are prepared by the polymerization of a monomer mixture consisting essentially of 60 to 80 weight percent of caprolactam and, correspondingly, 40 to 20 weight percent of a substantially equimolar mixture of a dibasic organic acid and a diamine in which the diamine component is a mixture of at least two of the stereoisomers of 2,4'-diaminobicyclohexyl or 4,4'-diaminobicyclohexyl. The dibasic organic acid is an alpha, omega-aliphatic dicarboxylic acid or an aromatic dicarboxylic acid.

DETAILED DESCRIPTION OF THE INVENTION

The diamine included in the monomer mixtures employed to prepare the polyamides of this invention consists of at least two of the stereoisomers of 2,4'-diaminobicyclohexyl or 4,4'-diaminobicyclohexyl. As will be appreciated by those skilled in the art, the 2,4'-diaminobicyclohexyls can exist in four stereoisomer forms, the cis,cis-isomer, the cis,trans-isomer, the trans,cis-isomer and the trans,trans-isomer, and the 4,4'-diaminobicyclohexyls can exist in three stereoisomer forms, the cis,cis-isomer, the cis,trans-isomer and the trans,trans-isomer. Thus, seven possible isomers of diaminobicyclohexyls can be employed in the present invention. For convenience of identification in the subsequent description, diaminobicyclohexyl will sometimes be identified as DACH with its stereo configuration being identified by two small letters, and the position of the amino substituents being identified by numbers. Thus, t,t-4,4'-DACH will represent trans,trans-4,4'-diaminobicyclohexyl.

The diaminobicyclohexyls which can be employed in the practice of the present invention are known compounds which can be prepared by the methods described in Canadian Pat. 837,126. The DACH products are conveniently prepared by a three-step process which consists of (1) the dinitration of biphenyl, (2) catalytic hydrogenation of the dinitrobiphenyl to the corresponding diamines of biphenyl, and (3) hydrogenation of the aromatic rings to the cyclohexyl rings. The DACH component employed in the invention should contain at least two of the seven possible stereoisomer and no one isomer should constitute more than 90 mol percent of the DACH mixture. No separation or purification of any products in the reaction sequence described above is required to obtain a DACH mixture meeting these specifications.

The organic dibasic acids included in the monomer mixtures employed to prepare the polyamides of the invention may be either alpha, omega-aliphatic dibasic acids or preferably an aromatic dibasic acid. The preferred aliphatic dibasic acids for use in the present invention are those containing from 5 to 12 carbon atoms in their structure, such as adipic acid, suberic acid and dodecanoic acid. Aromatic dibasic acids which can be employed in the present invention include terephthalic acid, isophthalic acid and ethylidenedibenzoic acid. The above-described acids are known compounds and many of them are available from commercial sources. Polyamides containing optimum transparency are obtained through the use of terephthalic or isophthalic acid.

To obtain polyamides having good transparency, the mixture of the diamine and the dibasic acid should be included in the monomer mixture in an amount constituting about 20 to 40 weight percent of the monomer mixture, with preferred results being obtained when the diamine-dibasic acid mixture constitutes about 25 to 35 weight percent of the monomer mixture. The balance of the monomer mixture to total 100 weight percent should be caprolactam. The percentage of the diamine-dibasic acid mixture required to obtain transparent polymers will depend somewhat upon the particular dibasic acid employed. Lower percentages of the diamine-dibasic acid mixture are required with aromatic dibasic acids.

The physical properties of the novel polyamides of this invention are generally similar to those of known caprolactam copolymers, except for their substantially greater transparency in thick molded sections. The melting points of the novel polyamides are usually in the range of about 135–185° C. The solubility characteristics of the polyamides of the invention are generally comparable to the solubility characteristics of nylon-6, although the polyamides of the invention are somewhat more soluble than nylon-6 in certain organic solvents. The novel polyamides can be prepared at molecular weights such that they have relative viscosities of the order of 2.0 to 2.6, as measured as 1% solutions in 90% formic acid at 25° C. The novel polyamides can be prepared so as to have melt indices in the range of 5 to 70, as measured at 235° C. with a 2160 g. loading. Tensile properties of the novel polyamides of the invention are generally comparable to those of nylon-6.

The novel polyamides are conveniently prepared by forming a salt between the diamine and dibasic acid and then mixing the preformed salt with the indicated quantity of caprolactam. The monomer mixture should then be placed in an oxygen-free reaction vessel and an inert gas, such as argon, should be continuously fed through the reaction zone during the polymerization to exclude oxygen and to remove water formed during the polymerization. The polymerizations are carried out over an extended period of time, utilizing time and temperature periods corresponding to those conventionally employed to prepare nylon-6. Typically, the polymerization will be initiated at a temperature of the order of 265° C. A polymerization period of the order of 12 to 24 hours is ordinarily required to complete the polymerization.

The caprolactam/diamine-dibasic acid monomer mixture can be polymerized without the use of polymerization initiators. If desired, however, small quantities of water of the order of 1–2 weight percent can be included in the monomer mixture to serve as a polymerization initiator. Certain organic and inorganic acids, such as acetic acid, phosphoric acid and the like, also can be employed as polymerization initiators at levels comparable to those conventionally employed in the homopolymerization of caprolactam. Since the diamine-diacid salt is not soluble in caprolactam, sufficient water may be added to the monomer mixture to provide a homogeneous solution for ease of handling. The water is rapidly evaporated on heating to polymerization temperatures.

The following examples are set forth to illustrate more clearly the principle and practice of this invention to those skilled in the art.

EXAMPLE 1

Part A

A solution of DACH in dimethylformamide was prepared by adding 21.6 g. (0.011 mol) of DACH to 150 ml. of dimethylformamide at room temperature. The DACH employed contained 50% of a mixture of the stereoisomers of 2,4'-diaminobicyclohexyl and 50% of the stereoisomers of 4,4'-diaminobicyclohexyl. In a like manner, a solution of azelaic acid in dimethylformamide was prepared by adding 18.8 g. (0.010 mol) of azelaic acid to 400 ml. of dimethylformamide and stirring at room temperature. The two solutions were poured together in a reaction vessel where they were stirred vigorously. A copious precipitate formed nearly immediately, the precipitate being the salt formed between the amine and the acid.

The above mixture was allowd to stand for 16 hours to insure completion of salt formation. The salt was separated by filtration, washed with benzene and refiltered. The salt was twice more washed and filtered in this manner, the final filtrate containing essentially no dimethylformamide. The salt was dried for 16 hours in a vacuum oven at 60° C. An essentially quantitative yield of salt was obtained.

Part B

A monomer mixture was prepared from 3.3 g. of the salt prepared in Part A and 6.7 g. of a purified polymerization grade caprolactam. The monomer mixture and 2.0 mol percent water were placed in a glass tube fitted with a gas inlet and gas outlet through which argon was circulated. The polymerization vessel was placed in a heating bath and the temperature was raised to 265° C. over a period of 1.5 hours and then held at 265° C. for 22 hours.

On cooling, a completely transparent block of solid polymer was obtained. The polymer had a relative viscosity of 1.97 (1 gram in 100 ml. of 90% formic acid—measured at 25° C.). The polymer was crushed and extracted in a Soxhlet apparatus with water to remove low molecular weight material (mostly caprolactam). The weight loss on extraction was 6.7%. After vacuum drying at 100° C., the extracted polymer exhibited a melting range of 158–162° C.

An aliquot of the polymer was compression molded into a plate 1" thick which was colorless and transparent, exhibiting substantially the transparency of window glass.

EXAMPLE 2

Example 1 was repeated except that the DACH employed contained approximately 60% of a mixture of the stereoisomers of 2,4'-diaminobicyclohexyl and approximately 40% of the stereoisomers of 4,4'-diaminobicyclohexyl. Comparable results were obtained.

EXAMPLES 3–9

Several additional polyamides were prepared following the procedures set forth in Example 1, but varying the dibasic acid moiety included in the salt formed between the diamine and the dibasic acid, the weight percent of caprolactam included in the monomer mixture, and the weight percent of water included in the monomer mixture. In each case, the block of solid polymer obtained was transparent. The experimental details are set forth in Table I.

TABLE I

| Example | Dibasic acid employed | Weight percent caprolactam | Wt. percent H₂O in monomer mixture [1] | Melting range, °C. |
|---|---|---|---|---|
| 3 | Terephthalic | 67 | 17 | 143–155 |
| 4 | do | 67 | 24 | |
| 5 | do | 71 | 24 | |
| 6 | do | 75 | 25 | |
| 7 | do | 67 | 25 | |
| 8 | Isophthalic | 71 | 25 | |
| 9 | do | 75 | 25 | |

[1] Percent of water based on the combined weight of caprolactam and the diamine-diacid salt.

EXAMPLES 10–14

Several additional polymerizations were run following the procedure described in Example 1, Part B, but varying the procedure in that the diamine and the diacid were mixed directly with the caprolactam and water rather than being first reacted to form a salt. In each case the block of solid polymer obtained was transparent. The experimental details are set forth in Table II.

TABLE II

| Example No. | Dibasic acid employed | Weight percent caprolactam | Wt. percent H²O in monomer mixture [1] | Relative viscosity [2] | Melt index [3] | Melting range [7] |
|---|---|---|---|---|---|---|
| 10 [4] | Sebacic | 67 | 1.3 | 1.98 | 14.4 | 172–185 |
| 11 [5] | Azelaic | 67 | 10 | 2.55 | | 174–190 |
| 12 | Isophthalic | 67 | 10 | | | 166–170 |
| 13 | Terephthalic | 67 | 10 | [6] 2.32 | | |
| 14 | 1,1-bis(4-carboxyphenyl)ethane | 67 | 10 | | | 145–165 |

[1] Percent of water based on weight of anhydrous monomers.
[2] Determined on water extracted and dried polymer unless otherwise noted. Measured at 25° C. on a solution of 1 g. of polymer in 100 ml. of 90% formic acid.
[3] Determined at 235° C. using 2,160 g. weight.
[4] Physical properties on injected molded sample were: Tensile at yield 8,800 p.s.i., tensile at break 8,200 p.s.i., elongation 88%.
[5] A compression molded film was tough, transparent and flexible.
[6] Measured on polymer as prepared without water extraction and drying.
[7] Determined on water extracted and dried polymer.

The physical properties and particularly the transparency of the polyamides of this invention are affected to a degree by the precise DACH isomer mixture included in the monomer mixture. The lowest level of transparency is obtained when the RACH included in the monomer mixture contains a high percentage of t,t-4,4'-DACH. Polyamides of excellent transparency are obtained, however, whenever the DACH employed contains no more than 90 mol percent of any individual DACH stereoisomer. Polyamides of optimum transparency are obtained by the polymerization of monomer mixtures in which the DACH included therein contains a mixture of the stereoisomers of both 2,4'-DACH and 4,4'-DACH. This is fortuitous, since the preparation of DACH by the process described in Canadian Pat. 837,126 ordinarily gives a mixture of all of the possible stereoisomers.

The polyamides provided by this invention can be employed in virtually all applications where nylon-6 and caprolactam copolymers are employed, such as the manufacture of film, fibers and molded articles. By reason of their superior transparency, however, they have outstanding utility for the manufacture of thick molded sections for use in lighting fixtures, outdoor advertising signs, and the like, where good light transparency is a requirement of the application.

The above description and particularly the examples are set forth for purposes of illustration only. Many variations and modifications thereof will be apparent to those skilled in the art and can be made without departing from the spirit and scope of the invention herein described.

What is claimed is:

1. A process for preparing a high molecular weight polyamide which is transparent in compression molded specimens 1" thick which comprises polymerizing a monomer mixture consisting essentially of 60 to 80 weight percent of caprolactam and, correspondingly, 40 to 20 weight percent of an essentially equimolar mixture of diaminobicyclohexyls and a dibasic organic acid; said diaminobicyclohexyls consisting of at least two of the stereoisomers of the 2,4'-diaminobicyclohexyl and 4,4'-diaminobicyclohexyl with no individual stereoisomer constituting more than 90 mol percent of such isomer mixture; said dibasic organic acid being at least one acid selected from the group consisting of alpha, omega-aliphatic dicarboxylic acids and aromatic dibasic acids.

2. A process of claim 1 wherein the monomer mixture consists essentially of from about 65 to about 75 weight percent of caprolactam and, correspondingly, about 35 to 25 weight percent of the equimolar mixture of the diamine and the dibasic organic acid.

3. The process of claim 10 wherein the dibasic organic acid included in the monomer mixture is azelaic acid.

4. The process of claim 1 wherein the dibasic acid is isophthalic acid.

5. A polyamide prepared by the process of claim 1.
6. A polyamide prepared by the process of claim 2.
7. A polyamide prepared by the process of claim 3.
8. A polyamide prepared by the process of claim 11.
9. A polyamide prepared by the process of claim 4.

10. A process for preparing a high molecular weight polyamide which is transparent in compression molded specimens 1" thick which comprises polymerizing a monomer mixture consisting essentially of 60 to 80 weight percent of caprolactam and, correspondingly, 40 to 20 weight percent of an essentially equimolar mixture of diaminobicyclohexyls and an alpha, omega-aliphatic dicarboxylic acid containing from 5 to 12 carbon atoms; said diaminobicyclohexyls consisting of at least two of the stereoisomers of the 2,4'-diaminobicyclohexyl and 4,4'-diaminobicyclohexyl with no individual stereoisomer constituting more than 90 mol percent of such isomer mixture.

11. The process of claim 1 wherein the diabasic acid is terephthalic acid.

References Cited
UNITED STATES PATENTS

| | | | |
|---|---|---|---|
| 2,512,606 | 6/1950 | Bolton et al. | 260—78 R |
| 2,625,536 | 1/1953 | Kirby | 260—78 R |
| 3,703,595 | 11/1972 | Falkenstein et al. | 260—78 L |

OTHER REFERENCES

C.A., vol. 68, 1968, 501606 p. 4877.

WILLIAM H. SHORT, Primary Examiner

L. M. PHYNES, Assistant Examiner